(12) United States Patent
Kimura et al.

(10) Patent No.: US 11,760,875 B2
(45) Date of Patent: Sep. 19, 2023

(54) PACKAGE OF HEAT-BENT POLARIZING SHEET AND INJECTION-MOLDED POLARIZING LENS

(71) Applicants: WINTEC, INC., Hyogo (JP); MITSUBISHI GAS CHEMICAL COMPANY, INC., Tokyo (JP); MGC FILSHEET CO., LTD., Saitama (JP)

(72) Inventors: Hideaki Kimura, Tokorozawa (JP); Masayuki Akaki, Tokorozawa (JP); Takashi Fujii, Tokorozawa (JP)

(73) Assignees: WINTEC, INC., Hyogo (JP); MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 597 days.

(21) Appl. No.: 16/645,709

(22) PCT Filed: Sep. 7, 2018

(86) PCT No.: PCT/JP2018/033214
§ 371 (c)(1),
(2) Date: Mar. 9, 2020

(87) PCT Pub. No.: WO2019/054295
PCT Pub. Date: Mar. 21, 2019

(65) Prior Publication Data
US 2020/0277123 A1    Sep. 3, 2020

(30) Foreign Application Priority Data
Sep. 12, 2017    (JP) .................................. 2017-174891

(51) Int. Cl.
*B65D 81/20* (2006.01)
*B29D 11/00* (2006.01)
(Continued)

(52) U.S. Cl.
CPC .......... *C08L 69/00* (2013.01); *B29D 11/0073* (2013.01); *B29D 11/00644* (2013.01);
(Continued)

(58) Field of Classification Search
CPC . G02B 1/08; G02B 1/041; G02B 5/30; G02B 5/3033; G02B 5/3025; G02C 7/12;
(Continued)

(56) References Cited

U.S. PATENT DOCUMENTS

2005/0145524 A1    7/2005    Lee et al.
2006/0110617 A1    5/2006    Kitaike et al.
(Continued)

FOREIGN PATENT DOCUMENTS

CN    1732192 A    2/2006
CN    101041387 A    9/2007
(Continued)

OTHER PUBLICATIONS

English translation of JP 2007253992. (Year: 2007).*
(Continued)

*Primary Examiner* — Jie Lei
(74) *Attorney, Agent, or Firm* — GREENBLUM & BERNSTEIN, P.L.C.

(57) ABSTRACT

A package of a heat-bent polarizing sheet for producing an injection-molded polarizing lens and an injection-molded polarizing lens that uses said sheet is provided. The heat-bent polarizing sheet is cumulatively packaged by a non-adhesive isolation film so as to withstand moisture and then stored or transported and can be used in injection molding without performing preliminary drying as a pretreatment of injection molding and without substantial protective-film removal work.

15 Claims, 1 Drawing Sheet

(51) Int. Cl.
  *B65D 77/04*  (2006.01)
  *C08L 69/00*  (2006.01)
  *B65D 85/38*  (2006.01)
  *G02B 1/08*   (2006.01)
  *G02C 7/12*       (2006.01)
  *B29L 11/00*      (2006.01)

(52) U.S. Cl.
  CPC ............ *B65D 77/04* (2013.01); *B65D 85/38* (2013.01); *G02B 1/08* (2013.01); *B29K 2995/0034* (2013.01); *B29L 2011/0016* (2013.01); *G02C 7/12* (2013.01)

(58) Field of Classification Search
  CPC . G02C 7/02; G02C 7/022; G02C 7/10; G02C 7/104; B65D 77/04; B65D 81/20; B65D 85/38; B65D 81/24; B65D 81/26; B29D 11/00644; B29D 11/0073; B29D 11/00; B29K 2995/0034; B29L 2011/0016
  USPC ............ 359/483.01, 485.03, 485.04, 489.11, 359/489.14, 489.2, 490.01, 517; 428/500, 428/354
  See application file for complete search history.

(56) References Cited

U.S. PATENT DOCUMENTS

| | | |
|---|---|---|
| 2008/0252972 A1 | 10/2008 | Chida et al. |
| 2010/0273019 A1 | 10/2010 | Kitaike et al. |
| 2013/0255195 A1 | 10/2013 | Gasber |
| 2017/0343703 A1 | 11/2017 | Yoshida et al. |

FOREIGN PATENT DOCUMENTS

| | | |
|---|---|---|
| CN | 104203754 A | 12/2014 |
| CN | 204324038 U | 5/2015 |
| CN | 104903761 A | 9/2015 |
| CN | 107108110 A | 8/2017 |
| EP | 3 214 018 A1 | 9/2017 |
| JP | 5-119216 | 5/1993 |
| JP | H08-248209 A | 9/1996 |
| JP | 2003-137351 A | 5/2003 |
| JP | 2003-145616 | 5/2003 |
| JP | 2005-082159 A | 3/2005 |
| JP | 2006-145254 | 6/2006 |
| JP | 2007-062740 A | 3/2007 |
| JP | 2007-253992 A | 10/2007 |
| JP | 2008-262104 | 10/2008 |
| JP | 2011-110879 | 6/2011 |
| JP | 2017-030847 A | 2/2017 |
| JP | 2017-132512 A | 8/2017 |
| WO | 2008/124223 A1 | 10/2008 |
| WO | 2014/084154 | 6/2014 |
| WO | 2016/067937 | 5/2016 |

OTHER PUBLICATIONS

European Search Report issued in European Patent Application No. 18857272.1 dated May 18, 2021.
Office Action issued in Chinese Patent Application No. 201880059173.7 dated Jun. 22, 2021, along with English Translation thereof.
Official Communication dated Dec. 18, 2018 in International Patent Application No. PCT/JP2018/033214.
Chinese Office Action dated Feb. 28, 2022 issued in Chinese Patent Application No. 201880059173.7 (containing reference categories, e.g., "Y", "A", etc.).
Office Action issued in Chinese Patent Application No. 201880059173.7, dated Aug. 26, 2022.

* cited by examiner

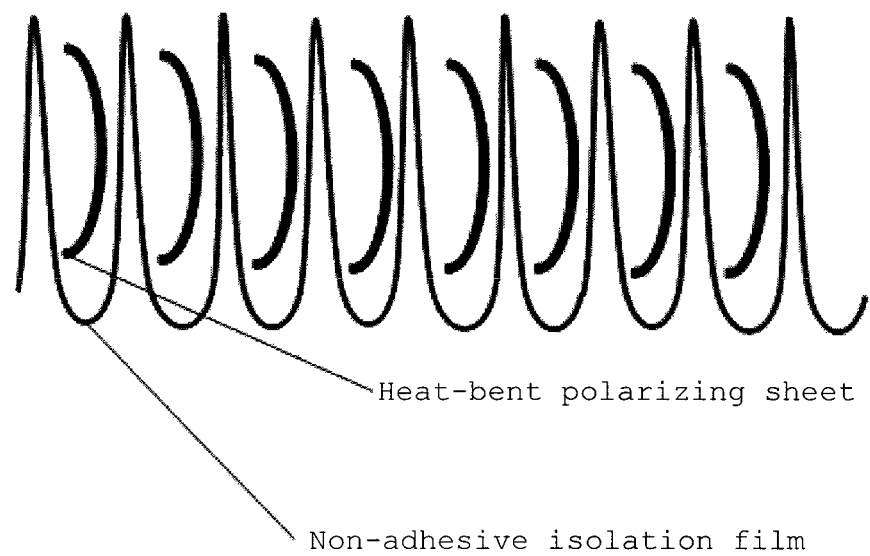

PACKAGE OF HEAT-BENT POLARIZING SHEET AND INJECTION-MOLDED POLARIZING LENS

TECHNICAL FIELD

The present invention relates to an injection-molded polarizing lens formed of an injection-molded transparent resin for use in sunglasses, goggles, etc., having an antiglare property and to a package of a heat-bent polarizing sheet for use in the injection molding.

BACKGROUND ART

Polarizing films formed of uniaxially stretched polyvinyl alcohol (PVA) films and iodine or a dichroic organic dye adsorbed thereto or impregnated therein are typically used in currently commercially available polarizers. Usually, a protective layer formed of a transparent resin such as triacetylcellulose is provided on one surface or both surfaces of the polarizing film so as to make an inexpensive, light-weight polarizer that is easy to handle and suitable for secondary processing.

Products that are required to have impact resistance, for example, polarizing lenses for sunglasses, are usually produced by forming a laminated polarizing sheet constituted by a polarizing film layer containing a dichroic organic dye, a functional layer such as a photochromic layer, and a protective layer formed of an aromatic polycarbonate sheet or film; punching the laminated polarizing sheet into a desired shape; heat-bending the resulting sheet to have a partial spherical surface; injection-molding an aromatic polycarbonate for lenses onto a concave surface side to form a polarizing lens (hereinafter referred to as an injection-molded polarizing lens); and surface-treating the polarizing lens as needed.

This production process includes (1) producing a polarizing film and a laminated polarizing sheet therefrom, (2) punching and heat-bending the laminated polarizing sheet, and (3) injection-molding an aromatic polycarbonate resin and, if needed, performing surface treatment.

The resulting products are processed by distributors into various lens shapes and sold as sunglasses (4).

Usually, these steps are performed separately and storage, preservation, transfer, transportation, distribution, etc., take place between the respective steps. Even when production is carried out in one venue, temporary storage or preservation is carried out due to production schedule and other various circumstances.

The laminated polarizing sheets produced in (1) are attached to protective films to protect their surfaces from fouling and foreign substances during handling, for example, distribution and processing.

One proposal of such protective films is a polyolefin protective film that withstands heat-bending in a high-temperature environment at around a glass transition temperature of aromatic polycarbonates (PTL 1 and PTL 2).

In (2), the laminated polarizing sheet with the protective films thereon is punched, preliminarily dried as a pretreatment, and heat-bent into a heat-bent product. Plural products are stacked as needed and packaged.

In (3), the heat-bent product is dried, the protective films are separated, the resulting sheet is set onto a mold, and an aromatic polycarbonate is injection-molded thereon.

Drying is performed in (2) to suppress color change during heat bending and is also performed in (3) to suppress color change during injection molding.

The polarizing layer becomes brittle as drying proceeds. Thus, during the punching step, punching is performed usually before drying. In some cases, the sheet is placed in a high-humidity room to allow the sheet to absorb moisture and then used (PTL 3). Furthermore, there has been a proposal of a method that uses a polyvinyl alcohol having a higher molecular weight (PTL 4).

Further, the inventors of the present invention have previously proposed a package which does not require preliminary drying in the above-described step (3) and an injection-molded polarizing lens that uses said package (PTL 5).

CITATION LIST

Patent Literature

PTL 1: Japanese Patent Application Publication No. 2003-145616
PTL 2: Japanese Patent Application Publication No. 2011-110879
PTL 3: Japanese Patent Application Publication No. 5-119216
PTL 4: Japanese Patent Application Publication No. 2008-262104
PTL 5: WO2016/067937 A1

SUMMARY OF INVENTION

Technical Problem

An object of the present invention is a further development in the proposal described in PTL 5 that does not require preliminary drying before injection molding even after preservation (storage, transfer, or transportation).

In the production steps according to the related art described above, storage, transportation, etc., accompany each step. Their storage environment is a typical warehouse or the like and humidity and temperature of the storage are not controlled. Assuming that the products are stored in an indoor warehouse, the storage environment is presumed to be about −10° C. to 40° C. and the humidity is presumed to be 5% to 90% although they depend on the region, seasonal factors, etc.

The storage period is usually relatively short from the production efficiency viewpoint. However, the period may be about 1 month when the products are not immediately used due to fluctuations in demand or may be as long as 6 months in a long term. In a long run, the period may even be longer.

The heat-bent polarizing sheet absorbs moisture when stored and preserved in the above-described environment for the above-described period. In order to suppress color change that occurs when moisture-laden products are injection-molded, preliminary drying is necessary as a pretreatment. Normally, preliminary drying is performed at 60° C. to 80° C. and preferably at 65° C. to 75° C. for 5 to 24 hours; however, in real operation, the conditions are selected as needed and drying is performed to an extent that does not cause color change that causes a problem during injection molding. The pretreatment significantly complicates the production process and schedule and affects production efficiency, thereby improvements have been desired.

The inventors of the present invention have newly quantified the relationship between the amount of water in the heat-bent polarizing sheet and color change during injection molding and the relationship between the amount of water in the heat-bent polarizing sheet and the water vapor partial pressure of the ambient gas that is in equilibrium relationship with the amount of water. Then the inventors have found a package of a heat-bent polarizing sheet that maintains the amount of water in the heat-bent polarizing sheet at which color change is acceptable, and an injection-molded polarizing lens prepared without preliminary drying of the packaged heat-bent polarizing sheet. Thus, the invention has been previously made and an application thereof has been filed.

In the present invention, as a result of further studies, the inventors have found a more labor-saving manufacturing process and the present invention has been completed.

Solution to Problem

The present invention provides the following:

(1). A package of a heat-bent polarizing sheet, in which a polarizing sheet heat-bent for injection molding is cumulatively packaged by means of a non-adhesive isolation film so as to withstand moisture, and then stored or transported,
wherein a heat-bent polarizing sheet can be used in injection molding without performing preliminary drying as a pretreatment of injection molding and without substantial protective-film removal work.

As will be described later, the polarizing sheet is a laminated polarizing sheet which prepared by bonding a transparent plastic sheet onto each of two sides of a polarizing film formed of a uniaxially stretched polyvinyl alcohol resin film with an adhesive layer interposed therebetween. The laminated polarizing sheet is used as an individual laminated polarizing sheet that has an original plate shape for individual lenses, the individual laminated polarizing sheet is heat-bent to form a spherical surface or an aspherical surface under heating to prepare a heat-bent polarizing sheet, the heat-bent polarizing sheet is set onto a mold, and a transparent resin for lenses is injection-molded onto a concave surface of the heat-bent polarizing sheet. Thereafter, an injection-molded polarizing lens can be obtained.

In the present invention, the heat-bent polarizing sheet is cumulatively packaged by means of a non-adhesive isolation film so as to withstand moisture, and then stored or transported. This has made it possible to supply a package of a heat-bent polarizing sheet which can be used in injection molding without performing preliminary drying as a pretreatment of injection molding and without substantial protective-film removal work, and an injection-molded polarizing lens that uses said package.

In the package of the heat-bent polarizing sheet of the invention of (1). described above:

(2). the packaged heat-bent polarizing sheet has a moisture content of 0.35 wt % or less and preferably 0.3 wt % or less; and
(3). an amount of water vapor in gas inside the package is 15 $g/m^3$ or less and preferably 14 $g/m^3$ or less.

Furthermore, in the package of the heat-bent polarizing sheet, (4). the transparent plastic sheet has a thickness of 0.1 to 1 mm and is a transparent plastic film or sheet containing at least one selected from the group consisting of an aromatic polycarbonate, polyacrylate, polyamide, acetylcellulose, and a composition containing an aromatic polycarbonate and an alicyclic polyester;
(5). the package is a primary package in which several dozen to several hundred heat-bent polarizing sheets which separated from protective films used during heat bending are cumulatively packaged by means of a non-adhesive isolation film, and a durable secondary package in which a plurality of the primary packages are packaged;
(6). the non-adhesive isolation film is selected from Polyolefin;
(7). the primary package or the durable secondary package has a sufficient buffer layer at least around the package and the buffer layer is formed of a non- or low-dust-generating material or covered with a non- or low-dust-generating material so that the buffer layer has a non- or low-dust-generating property;
(8). the primary package is a package in which heat-bent polarizing sheets are accommodated in a loadable container and the container is formed of a non- or low-dust-generating material or covered with a non- or low-dust-generating material so that the container has a non- or low-dust-generating property; and
(9). a package material used in the secondary package is at least one selected from a single-wall corrugated fiberboard, a double-wall corrugated fiberboard, a triple-wall corrugated fiberboard, a plastic, a corrugated plastic, etc.

Furthermore, (10). a dampproof package material is used in packaging of the primary package or the secondary package; and
(11). air inside packaging of the primary package or the secondary package, is substituted with dry air or nitrogen, or pressure thereof is reduced inside.

In the package of the heat-bent polarizing sheet, (12). a desiccant is enclosed and the desiccant is at least one selected from silica gel, quicklime, a calcium chloride processed product, silica alumina gel, viscosity, and a sheet-shaped desiccant;
(13). a sensor that detects packaging conditions is enclosed and the sensor detects water vapor partial pressure or oxygen; and
(14). the package is sealable or easy-sealable after the package is unsealed.

In the invention of (1). described above, the present invention provides the following, (15). an injection-molded polarizing lens, in which a heat-bent polarizing sheet is subjected to injection molding without performing preliminary drying as a pretreatment of injection molding and without substantial protective-film removal work.

Advantageous Effects of Invention

A heat-bent article in the package according to the present invention is excellent in preventing moisture absorption during long-term storage and has made it possible to produce a good-quality injection-molded polarizing lens without performing preliminary drying as a pretreatment of injection molding and without substantial protective-film removal work on the heat-bent article stored for a long time.

BRIEF DESCRIPTION OF THE DRAWING

FIG. 1: FIG. 1 is a schematic diagram showing a package form of a package of a heat-bent polarizing sheet regarding the present invention.

DESCRIPTION OF EMBODIMENTS

The features of the present invention will now be described.

Polarizing Film

A polyvinyl alcohol resin film is used as a base film of the polarizing film.

Examples of the polyvinyl alcohol resin include polyvinyl alcohol (PVA) and its derivatives and analogs such as polyvinyl formal, polyvinyl acetal, and a saponified poly (ethylene-vinyl acetate) copolymer. PVA is preferable.

The weight-average molecular weight of the PVA film is 50,000 to 350,000 and particularly preferably 150,000 to 300,000. The thickness of the raw material PVA film is usually about 50 to 300 μm. The thickness of the PVA polarizing film prepared by stretching and dyeing the raw material PVA film is usually 10 to 50 μm and preferably 20 to 40 μm.

The stretching ratio of the PVA film is usually in the range of 2 to 8 and is preferably 3 to 6.5 from the viewpoint of strength after stretching.

The polarizing film (dyed and stretched PVA film) is produced by, for example, stretching a film base composed of the above-described polyvinyl alcohol in water in one direction while dyeing the film base with a dichroic organic dye and then treating the resulting film with boric acid or an aqueous solution of a metal salt or the like, followed by drying.

Laminated Polarizing Sheet

In the present invention, a transparent protective film or sheet (hereinafter "film or sheet" is simply expressed as "sheet") is bonded to at least one side of the polarizing film having the layer structure described above so as to form a laminated polarizing sheet.

Examples of the transparent protective sheet include sheets composed of transparent resins such as aromatic polycarbonate, amorphous polyolefin, polyacrylate, polysulfone, acetylcellulose, polystyrene, polyester, polyamide, and any mixture of these such as a composition containing an aromatic polycarbonate and an alicyclic polyester. Among these, acetylcellulose is essential for producing most versatile polarizing films. An aromatic polycarbonate resin is preferable due to properties such as mechanical strength and impact resistance. Polyolefin, polyacrylate, and polyamide are preferable for their chemical resistance. Polyacrylate and polyamide are preferable for their dyeing affinity after lens formation.

From the viewpoints of film strength, heat resistance, durability, and bendability, an aromatic polycarbonate sheet is preferably formed of a polymer produced by a known method from a bisphenol compound whose representative example is 2,2-bis(4-hydroxyphenyl)alkane or 2,2-(4-hydroxy-3,5-dihalogenophenyl)alkane. Its polymer skeleton may contain a structural unit derived from a fatty acid diol or a structural unit that has an ester bond. In particular, an aromatic polycarbonate derived from 2,2-bis(4-hydroxyphenyl) propane is preferable.

The molecular weight of the aromatic polycarbonate in terms of viscosity-average molecular weight is preferably 12,000 to 40,000 and more preferably 20,000 to 35,000. Aromatic polycarbonates have a large photoelastic modulus and colored interference fringes and voids are prone to occur due to birefringence caused by stress and orientation. Thus, a large retardation value is preferably imparted in advance so as to eliminate voids and hide colored interference fringes. The retardation value is 2000 nm or more and 20000 nm or less, preferably 3000 nm or more, and, considering the decrease that occurs during processing, preferably 4000 nm or more.

The retardation value is substantially proportional to the degree of orientation and the magnitude of residual stress. The higher the retardation value, the lower the precision of the surface geometry and the stronger the tendency to expand in a direction perpendicular to the stretching direction. There is a drawback in that this direction perpendicular to the stretching direction is coincident with the direction of the transmission axis of the polarizing film in a typical laminated structure. Voids and colored interference fringes are recognizable with human eye through the polarizing film. Thus, the effect of the sheet given high retardation is exhibited when the sheet is used on the light incident side of the polarizing film, in other words, on the side opposite to human eye.

The thickness of an aromatic polycarbonate sheet can be selected between 0.1 and 1 mm accordingly.

The alicyclic polyester resin of the present invention that can be contained in the composition together with an aromatic polycarbonate and that can be used as a protective layer-forming sheet or film or an injection molding resin for lenses is obtained by a known method that involves, for example, performing esterification or transesterification of a dicarboxylic acid component such as 1,4-cyclohexanedicarboxylic acid, a diol component such as 1,4-cyclohexanedimethanol, and small amounts of other optional components, adding a polymerization catalyst as needed, and gradually decreasing the pressure inside the reactor to perform polycondensation reaction.

Examples of the polyamide resin include those known as transparent polyamide resins for lenses. The heat deflection temperature, which is one reference of heat resistance, is within the range of 100° C. to 170° C. Examples thereof include aromatic polyamide resins, alicyclic polyamide resins, aliphatic polyamide resins, and copolymers of these. Alicyclic polyamide resins, which have well-balanced mechanical property, chemical resistance, transparency, etc., are preferable but two or more types of polyamide resins may be used in combination. Examples of such polyamide resins include GLILAMID TR FE5577 and XE 3805 (produced by EMS), NOVAMID X21 (produced by Mitsubishi Engineering-Plastics Corporation), and TOYOBO nylon T-714E (produced by TOYOBO CO., LTD.).

(Meth)acrylic resins may be homopolymers of various (meth)acrylic acid esters such as polymethyl methacrylate (PMMA) and methyl methacrylate (MMA), copolymers of PMMA or MMA with at least one other monomer, or mixtures of these resins. Among these, a (meth)acrylate that contains a cyclic alkyl structure and has low birefringence, a low hygroscopic property, and excellent heat resistance is preferable. Examples of such a (meth)acrylic resin include ACRYPET (produced by Mitsubishi Rayon Co., Ltd.), DELPET (produced by Asahi-Kasei Chemicals Corporation), and PARAPET (produced by Kuraray Co., Ltd.).

Examples of the adhesive used to bond transparent plastic sheets onto both sides of the polarizing film include polyvinyl alcohol resin materials, acrylic resin materials, urethane resin materials, polyester resin materials, melamine resin materials, epoxy resin materials, and silicone materials.

When an aromatic polycarbonate sheet is used, a two-liquid-type thermosetting urethane resin constituted by a polyurethane prepolymer, which is a urethan resin material, and a curing agent is preferable from the viewpoints of the adhesive layer itself, transparency when bonded, and adhesion to the aromatic polycarbonate sheet.

When a high-retardation aromatic polycarbonate sheet is used, usually, an adhesive solution is applied to a polarizing film and preliminarily dried to reduce the amount of solvent. Then an aromatic polycarbonate sheet or film is placed thereon and the same is conducted for the opposite surface. Then aging and curing is performed under conditions that do not accelerate deterioration of the polarizing layer, in particular, while maintaining the temperature and humidity constant. A laminated polarizing sheet can be produced in the same manner in the present invention also.

The layer structure of the laminated polarizing sheet according to the present invention is not limited to the scope described above. For example, an adhesive that contains a photochromic dye, an ultraviolet absorber, an infrared absorber, and other materials dissolved therein may be used as needed as the adhesive that bonds a polarizing film and a transparent protective layer. Alternatively, a transparent protective sheet to which these functional additives have been added may be used.

Heat-Bent Polarizing Sheet

The laminated polarizing sheet produced as described above is processed to have an original plate shape for individual lenses so as to prepare an individual laminated polarizing sheet, and the individual laminated polarizing sheet is heat-bent to have a spherical surface or an aspherical surface under heating to prepare a heat-bent individual laminated polarizing sheet (hereinafter referred to as a heat-bent polarizing sheet).

Processing into an individual laminated polarizing sheet (the original plate shape for individual lenses) is usually carried out by simultaneously punching plural individual laminated polarizing sheets by using a punching blade that includes a Thomson blade in view of production efficiency. The shape of the individual laminated polarizing sheets is selected according to the shape of the final product (sunglasses, goggles, etc.). For example, a standard shape for two eyes is a puck having a diameter of 80 mm or a slit shape obtained by cutting two equal-width end portions of the puck in a direction perpendicular to the polarisation axis.

In order to satisfactorily punch the individual laminated polarizing sheets, an appropriate level of resilience is needed.

In a laminated polarizing sheet that includes a protective layer formed of an aromatic polycarbonate sheet (hereinafter this sheet is referred to as an aromatic polycarbonate polarizing sheet), the polarizing film layer, the adhesive layers, and the protective films on both surfaces do not break extensively because the aromatic polycarbonate sheet portions do not break excessively during punching; thus, generation of minute broken fragments, propagation of cracks in the stretching direction, and whether excessive deformation elongation occurs are the subjects of the study. Here, as mentioned above, a method that uses an appropriately moisturized sheet is also recommendable in order to prevent generation of minute broken fragments as a result of performing punching on a dry polarizing layer.

Next, the individual laminated polarizing sheet is subjected to a preliminary drying treatment and then heat-bent to have a spherical surface or an aspherical surface under heating so as to prepare a heat-bent polarizing sheet. The conditions for preliminary drying are selected such that color change does not occur after heat bending of the individual laminated polarizing sheet. Usually, air drying at 60° C. to 80° C. and preferably 65° C. to 75° C. is performed for 8 hours or more and preferably for about 24 hours.

The aromatic polycarbonate polarizing sheet is heat-bent along a surface of a mold used for injection molding. By heat bending, a flat individual laminated polarizing sheet is usually formed into a three-dimensional curved surface such as a partial spherical surface or an elliptical surface in some cases. This processing in which the energy accompanying the deformation is minimum involves contraction. If smooth contraction is inhibited, waves and, furthermore, wrinkles occur and good-quality products cannot be produced. Thus, in order to ensure smooth contraction, the temperature, the load, etc., are preferably gradually controlled.

A temperature equal to or higher than a temperature 50° C. lower than the glass transition temperature of the transparent plastic sheets used as the protective sheets but lower than the glass transition temperature is selected as the heating temperature. For an aromatic polycarbonate polarizing sheet, the maximum temperature of the bending mold used in heat bending is equal to or higher than a temperature 25° C. lower and preferably 20° C. lower than the glass transition temperature of the aromatic polycarbonate but equal to or lower than a temperature 5° C. lower than the glass transition temperature.

Preferably, a preliminary heat treatment is conducted in which the temperature of the aromatic polycarbonate polarizing sheet immediately before bending is adjusted to a temperature equal to or lower than the temperature used in bending but at which no color change occurs in a short time. For example, for an aromatic polycarbonate polarizing sheet, the temperature is preferably adjusted to 25° C. lower than the glass transition temperature of the aromatic polycarbonate.

Package

The package of the heat-bent polarizing sheet according to the present invention is a package that maintains the moisture content of the heat-bent polarizing sheet at an appropriate value for a desired period of time and protects the sheet from appearance defects such as scratching, deposition of foreign substance, etc., on the heat-bent polarizing sheet.

The amount of water in the heat-bent polarizing sheet is quantified in terms of the moisture content as shown in Examples described below. As a result, it has been found that the amount of water in the heat-bent polarizing sheet immediately after heat-bending and after a drying treatment that precedes injection molding is 0.15 wt % or less. When a heat-bent polarizing sheet having a water content exceeding 0.4 wt % is injection-molded, extensive color change occurred after injection molding and appearance defects were generated.

In view of the above, an appropriate value of the moisture content of the heat-bent polarizing sheet is 0.35 wt % or less and preferably 0.3 wt % or less. When the package is being formed, the heat-bent polarizing sheet must be enclosed while its moisture content is kept at the appropriate value and the moisture content must be maintained.

The moisture absorbing rate differs significantly with the environment. In general, moisture absorption gradually starts when the temperature reaches 100° C. or lower and rapid moisture absorption starts at a temperature of 60° C. to 70° C. or lower. A plastic material used in a dampproof package usually has heat resistance of 70° C. or higher and thus by packaging the heat-bent polarizing sheet at about 60° C. to 70° C. by using the dampproof material, the moisture content of the heat-bent polarizing sheet is maintained at the appropriate value during packaging.

In this description, the moisture content is obtained by converting the amount of water measured with a gas pressure-type moisture meter (AQUATRAC produced by ITS Japan Corporation) into a moisture content of a specimen. The measurement meter measures the amount of water by vacuuming the sample in a container, heating the sample, inducing evaporated moisture to react with a reagent (such as hydrogenated calcium), detecting the pressure of the generated hydrogen gas with a sensor, and determining the amount of water from the sample weight.

Next, the package is a primary package in which several dozen to several hundred heat-bent polarizing sheets which separated from protective films used during heat bending are cumulatively packaged by means of a non-adhesive isolation film, or a durable secondary package in which a plurality of the primary packages are packaged.

Separating protective films used during heat bending and packaging a heat-bent polarizing sheet by means of a non-adhesive isolation film is typically performed at normal temperature and it takes a certain amount of time because many sheets are handled.

From this point of view, a method of temporarily storing the heat-bent polarizing sheet and performing packaging in a separate step is a preferable example such that the heat-bent polarizing sheet is handled in an environment where the moisture content thereof is maintained at an appropriate value.

Furthermore, examples of the non-adhesive isolation film include films constituted by high density polyethylene (HDPE), low density polyethylene (LDPE), polypropylene, polybutadiene, or polyolefin such as a combination of these comonomers.

When it is difficult to conduct packaging before start of moisture absorption due to the production process, the heat-bent polarizing sheet is temporally stored in a low-humidity storage or the like to prevent the heat-bent polarizing sheet from absorbing moisture and packaging is performed in a separate step. Conditions of the low-humidity storage are appropriately selected to maintain the moisture content of the heat-bent polarizing sheet at an appropriate value. Specifically, Super Dry SD-702-D1X produced by Toyo Living Co., Ltd., can be used.

When the heat-bent polarizing sheet has re-absorbed moisture after its production, the heat-bent polarizing sheet can be dried again and used. The drying method involves selecting the drying time that can yield the moisture content described above and performing air drying at 80° C. or lower, typically.

In Examples described below, the amount of water vapor in the gas inside the package in equilibrium with the amount of water contained in the heat-bent polarizing sheet was also quantified. Measurement is performed with a gas chromatograph (GC-2014 produced by Shimadzu Corporation).

In this description, the amount of water vapor in the gas is measured in accordance with Japanese Unexamined Patent Application Publication No. 2006-145254.

The results indicate that when the moisture content of the heat-bent polarizing sheet is 0.48 wt %, which is above the appropriate value, the amount of water vapor in the ambient gas in equilibrium therewith is about 16 g/m³.

Thus, the appropriate value of the amount of water vapor in the gas inside the package is 15 g/m³ or less and preferably 14 g/m³ or less. At this value, the moisture content of the heat-bent polarizing sheet can be maintained at the appropriate value.

The gas inside the package is preferably evacuated in advance based on the assumption that the package will be transported under a reduced pressure. Considering the environment of the cargo compartment of air cargo transportation nowadays, an evacuation treatment down to a volume approximately equal to that under the reduced pressure is not necessary.

In order to make the amount of water vapor in air inside the package constant, dehumidified air, nitrogen, or the like may be injected as needed.

A dampproof package material that can be used in the present invention has impermeability to water vapor.

Naturally, the water vapor transmission rate of the dampproof package material significantly differs depending on the difference from the temperature and water vapor pressure of the ambient environment. Evaluation is preferably conducted on the assumption that the package that uses the dampproof package material will be exposed to a 40° C., 90 RH % ambient environment, which is severer than the typical storage environment, for a long period of time. It is preferable to use, as the dampproof package material, a material that shows a particular level of performance in such an environment.

Specifically, a performance index of a package that uses a dampproof package material is calculated and the result can be used as the reference for constructing the package of the present invention. In this description, the performance of a package including adhesive layer portions (adhesive tapes, fusion bonding layers, etc.) used to seal the package is considered. The environment outside the package is presumed to be 40° C./90 RH %, which is presumed to be a severe storage environment.

The performance index is the value obtained by adding the water vapor transmission rate (Di), the surface area (Si), and the thickness (di) of the material (i) constituting the container for each constitutional element, and dividing the obtained value by the volume (V) inside the package. This is expressed by formula (1) below.

The smaller the value of the performance index represented by formula (1), the smaller the change in humidity inside the package and the better the dampproof property. When the initial conditions and the ambient environment are adjusted to be the same and the package is left standing, the permissible storage time becomes longer as the performance index decreases. When the performance index is halved, the permissible storage time doubles. When the performance index is decreased to one tenth, the permissible storage time increases tenfold.

$$\text{Performance index} = \frac{1}{V}\sum_{i=1}^{n}\frac{Di \cdot Si}{di} \qquad \text{Formula (1)}$$

The performance of the package is evaluated through the performance index described above, for example, and a dampproof package material optimum for the desired storage period is selected to maintain the amount of water vapor inside. Thus, the package of the present invention can be obtained.

Specifically, in the case of a package that uses a package having a dampproof performance index of formula (1) of $6.092 \times 10^{-5}$ (hour$^{-1}$) or less, the amount of the water vapor in the gas inside can be anticipated to be maintained for about 3 months. However, in actual environment, the humidity and temperature conditions are often lower than in the above-described severe environment used as a presumption and thus it is believed that the dampproof property can be maintained over a period longer than the anticipated period.

When the package has a performance index equal to or higher than the above-described value, it may be necessary to take countermeasures such as enclosing a desiccant described below.

Specifically, the material for the dampproof package material can be selected from polymer materials such as stretched or non-stretched polypropylene, polyethylene, polyurethane, and polyethylene terephthalate. Considering the prevention of transmission of water vapor, an inorganic layer is preferably laminated or vapor-deposited on the material.

When an inorganic layer is laminated, specifically, the film is an inorganic layer and more preferably a metal layer having a thickness of 1 μm to 50 μm, preferably 3 μm to 30 μm, and more preferably 5 μm to 20 μm. When the thickness of the metal layer is decreased, it becomes difficult to maintain water vapor impermeability due to pinholes and the like and increasing the number of layers by using a plastic material or improving the thickness of the dampproof package material as a whole will be needed, for example.

A dampproof package material having a particular degree of strength is selected to prevent breakage due to physical stress occurring during transportation and storage. In order to improve strength of the dampproof package material, the number of layers may be increased by stacking polyethylene films and the like in a network shape.

The thickness of the dampproof package material is increased as needed to improve strength. From the viewpoint of productivity, when a thick dampproof package material is used and sealing by fusion bonding is selected, longer heating is needed to perform fusion bonding and thus an appropriate thickness is selected.

In view of performance of the package, a desiccant may be enclosed as needed.

The desiccant may be selected from silica gel, quicklime, a calcium chloride processed product, silica alumina gel, clay, a sheet-shaped desiccant, etc., or may be any combination of the foregoing.

The amount of the desiccant to be enclosed is adjusted as needed depending on the dampproof performance of the package. When the dampproof performance of the package is low as described above, maintaining dry conditions inside depends on the desiccant and a large quantity of desiccant needs to be enclosed.

For example, a hygroscopic agent or a hygroscopic film may be laminated onto the dampproof package so as to impart hygroscopic performance to the package. In this manner, the step of enclosing desiccants can be omitted and there is no need to examine the amount of the desiccants to be enclosed.

Specifically, ACTIVE PACK produced by FUJIGEL SANGYO LTD., can be used.

Sensor

The heat-bent polarizing sheet does not undergo color change easily recognizable with naked eye even when the heat-bent polarizing sheet has absorbed moisture beyond the appropriate value of the moisture content. Thus, quality cannot be confirmed unless a special device is used to measure the moisture content of the heat-bent polarizing sheet or unless the packaged heat-bent polarizing sheet is removed and injection-molded and the production process is over. If the package is broken and does not maintain the dampproof property due to accident or the like, it is difficult to identify the moisture content of the heat-bent polarizing sheet.

In view of the above, a sensor that enables visual identification of whether the dampproof conditions are maintained is preferably provided to the package of the heat-bent polarizing sheet.

The sensor may be one that senses the amount of water vapor inside the package or one that sense the moisture content of the heat-bent polarizing sheet enclosed in the package. The sensor may be one that detects oxygen inside or may be a combination of any of the foregoing.

Specifically, the sensor may be constituted by something that shows the history that the amount of the water vapor inside the package has exceeded the appropriate range described above through numerical values, color change, weight change, or the like. From the viewpoint of showing the humidity history, the sensor is preferably irreversible. The sensitivity of the sensor is appropriately adjusted so that the sensor reacts when the amount of the water vapor in the inside air is beyond the appropriate range described above.

More specifically, the sensor may be one or a combination selected from one that accompanies color change depending on the degree of moisture absorption, such as cobalt chloride Or cobalt bromide, and one that shows the history of moisture absorption through changes in weight of the hygroscopic material due to moisture absorption. More specifically, the sensor may be one or a combination selected from humidity indicators that contain the above-described substances, silica gel, etc.

As mentioned above, when nitrogen or the like is to be enclosed inside the package, a sensor that senses oxygen when the package is broken due to accident or the like and air enters the package can be used.

These sensors may be installed inside the dampproof package, on the inner side of the inner container, or on the inner side of the dampproof package material.

Form of Package

Plural heat-bent polarizing sheets may be packaged with a package material to form an auxiliary primary package or a primary package. In view of durability, plural auxiliary primary packages or primary packages are packaged with a durable material so as to form a secondary package. A buffer layer is provided to the package at any of the above-described stages and a dampproof package material is used in the package at any of the above-described stages, followed by sealing so as to prepare a package that is loadable.

The number of the heat-bent polarizing sheets to be packaged is usually equal to or less than the number at which the moisture content of the heat-bent polarizing sheets can be maintained within the appropriate range after unsealing the package and until all sheets are used, and the number that is not excessively large for unit operation is selected. With mold cavities, force applied by the highly pressurized injected resin is loaded symmetrically with respect to the center axis and the surface and the design thereof does not generate distortion. Thus, the number of cavities in the mold is an even number and thus the smallest unit of the number of the sheets packaged is preferably a multiple of the number of cavities.

In view of the above, the auxiliary primary package containing a number of sheets selected from 10 to 400 can be formed and a primary package containing a number of sheets selected from 10 to 1000 can be formed.

In order to improve durability of the package, several to 100 auxiliary primary packages or primary packages may be packaged with a durable package material to form a secondary package.

The dampproof package material used in the package of the heat-bent polarizing sheet according to the present invention can be used in any stage of the packages described above.

The package takes a form that is loadable for the purpose of transportation and storage.

Specifically, at any stage selected from the auxiliary primary package and the primary package, packaging can be conducted by using a container so that the package is loadable.

The container may have a tray shape, a bag shape or a cylindrical shape. The material for the container and the package can be selected from paper, non- or low-dust generating paper, cardboard, plastic, etc., or can be a combination of the foregoing. In the step of injection molding in which the heat-bent polarizing sheet is used, cleanliness of the environment must be controlled to address appearance defects after molding. Thus, the material is preferably selected from plastic materials and the like. Specific examples of the container include plastic containers formed by injection molding, hollow molding, vacuuming, pressure forming, or inflation molding, for example.

In case of mechanization such as automation of injection molding, or of using electronic technology such as LSI, it seems not impossible to easily use those which perform the same task as person. However, considering the economic efficiency, there is no practicality unless the machine is more inexpensive, and as easy, simple and reliable as possible.

In the case where a heat-bent polarizing sheet is set onto a mold with a machine:

1). A protective film for the time of thermoforming, etc., which usually requires skill even by manual labor, needs to be separated and removed. In other words, a protective film that does not require any substantial protective-film removal work is essential.

2). From the viewpoint of implementation with simple operation, heat-bent polarizing sheet is held at the same position and part. Further, releasing is performed at mold mounting position, and which is at the same position and part.

3). Holding and releasing a heat-bent polarizing sheet by simple operation. From the viewpoint thereof, it is suitable that holding and releasing are performed by adsorption and desorption at a central part of the concave surface of a heat-bent polarizing sheet. The primary package form is preferably a package form which can realize these actions with easy and simple operations.

The primary package form is a package form, which, according to above-described 1), has been separated and removed from protective films, which, according to 2), can be moved to the same position as needed, and which, according to 3), can realize that the concave surface side of a heat-bent polarizing sheet has been released at the time of holding.

The case which conducted one example of packaging which satisfied the above-described requirements 1) and 2), was described in Examples.

In this case, a three sided seal bag was formed as shown in the accompanying drawing. In other words, a continuous peelable film with a width sufficient to put a heat-bent polarizing sheet (a polarizing sheet) was used, a double-layered portion was formed so as to have a sufficient depth, and the side thereof was sealed.

The continuum of this three sided seal bag can be winded up. Further, by stretching, said continuum becomes continuum in which a non-sealed surface is opened. This opening part allows a polarizing sheet to be easily taken in and out, and the position thereof to be easily adjusted.

Next, the package material that fulfills all the requirements includes a concave bottom auxiliary tool, a convex upper auxiliary tool, a cylindrical material with strength that can perform a positioning function, and peelable film. As an example of packaging, a cylindrical material with strength that can perform a positioning function (a cylindrical material) is erected and held, a concave bottom auxiliary tool (a bottom material) is held at the top of the cylindrical material with a holding auxiliary tool (a bottom holding tool), and an end of continuous peelable film with a predetermined width is superimposed thereon. The convex surface side of a heat-bent polarizing sheet (a polarizing sheet) from which a protective film has been separated and removed, is superimposed thereon. The continuous peelable film with predetermined width is moved so as to form double layers, and is superimposed on the concave surface side of the polarizing sheet. The bottom holding tool is lowered by the equivalent to the thickness of the polarizing sheet and the double-layered continuous peelable film, the operation of superimposing the polarizing sheet and the double-layered continuous peelable film and lowering the equivalent thickness thereof is repeated, after superimposing set number of polarizing sheets, it is closed with a convex upper auxiliary tool (a lid material), and the whole thereof is packaged in a cylindrical or sac-like packaging film as needed.

In this primary package, the double-layered continuous peelable film can be pulled out from one side, and the concave surface side of the top of the multilayered heat-bent polarizing sheets is easily released. Also, by the reverse operation of the same as the bottom holding tool, the position of the concave surface side of the released multilayered heat-bent polarizing sheets can be adjusted to the same.

In other words, it become possible to set onto a mold by holding and transferring by vacuum-suction from the concave surface side of, the packaged multilayered heat-bent polarizing sheets, and not to substantially change the position of vacuum-suction from the concave surface side of the packaged multilayered heat-bent polarizing sheets.

In order to prevent breaking of the heat-bent polarizing sheet and the package due to physical stress during transportation and storage, a buffer layer having a sufficient thickness is provided to the package. The buffer layer may be provided at any stage selected from the auxiliary primary package, the primary package, and the durable secondary package.

The material for the buffer layer is one or a combination selected from paper, cardboard, plastic, etc. As described above, when the environment cleanliness is being controlled, it is preferable to use a low-dust-generating material such as a bubble buffer material in which air fills columnar projections formed in one of the two polyethylene sheets so that the material functions as a buffer layer.

The durable package material used in secondary packaging is one or a combination selected from a single-wall corrugated fiberboard, a double-wall corrugated fiberboard, a triple-wall corrugated fiberboard, a plastic, a corrugated plastic, etc.

The volume of the secondary package is determined by considering the margin for absorbing the volume fluctuation of the auxiliary primary packages and primary packages inside by assuming that the package will be transported at a reduced pressure.

The package is sealed by a method effective for maintaining the dampproof performance of the package. The package is sealed by fusion bonding, by using adhesive tapes that make close contact, by using zippers, or by any combination of the foregoing.

When fusion bonding is employed, the fusion-bonding surface temperature of the package material used in fusion bonding is controlled to unfailingly reach a temperature higher than the fusion bonding temperature and a heating time long enough for the heat capacity is taken. Overheating of the surface layer of the package material is avoided and the temperature and the heating time are appropriately selected to prevent heating deficiency, thereby preventing defects in the sealing state created by fusion bonding. Factors such as the material used for the fusion bonding layer, the thickness and fusion-bonding area of the fusion bonding layer, etc., are also selected by considering the influence on the dampproof performance of the package.

When an adhesive tape is used for sealing, an adhesive tape that maintains a sufficient close-contact state in an environment the adhesive tape is exposed to during storage and transportation is selected. Specifically, a waterproof adhesive tape is preferably selected.

When zippers are used, a double zipper structure that can maintain sufficient airtightness is preferable.

In order to prevent moisture absorption during a short period of time in which the heat-bent polarizing sheets are being used after unsealing the package, the package can be designed to be re-sealable through a combination of these methods. Specifically, a primary seal may be formed by performing fusion bonding to seal the package and a secondary seal that allows re-sealing, such as an adhesive tape or a zipper, may be provided on the inner side or outer side of the primary seal. In this manner, the package is still suitable for long-term storage and preservation and moisture absorption during a short time after unsealing can be prevented by using the secondary seal after unsealing the package.

Injection-Molded Polarizing Lens

A heat-bent polarizing sheet in the dampproof package is taken out of the package, protective films are removed as needed, and the heat-bent polarizing sheet is set onto a mold. A transparent resin for lenses is injection-molded thereon to produce an injection-molded polarizing lens.

Preferable examples of the transparent resin for lenses include an aromatic polycarbonate, polyacrylate, acetylcellulose, and a composition containing an aromatic polycarbonate and an alicyclic polyester. In the present invention, an aromatic polycarbonate is preferred as the transparent resin for lenses and injection molding is typically conducted at a resin temperature of 260° C. to 340° C. and preferably 270° C. to 310° C., an injection pressure of 50 to 200 MPa and preferably 80 to 150 MPa, and a mold temperature of 60° C. to 130° C. and preferably 80° C. to 125° C.

Usually, the heat-bent polarizing sheet that has undergone storage and transportation is subjected to preliminary drying at 60° C. to 80° C. and preferably 65° C. to 75° C. for 5 to 24 hours as a pretreatment for suppressing color change during injection molding. However, the heat-bent polarizing sheet packaged in the package of this description can be used in the injection molding step immediately after unsealing and without performing preliminary drying.

The aromatic polycarbonate injection-molded lens produced as described above is subjected to a hard coat treatment as needed and then a mirror coat or an antireflection coat, for example, is formed thereon to obtain a product.

The material for the hard coat must have good appearance and excellent adhesiveness to the underlying aromatic polycarbonate and an inorganic layer, such as a mirror coat or an antireflection coat, subsequently formed thereon. From this viewpoint, for the processing conditions of the hard coat, the firing temperature is preferably equal to or higher than a temperature 50° C. lower than the glass transition temperature of the aromatic polycarbonate sheet and lower than the glass transition temperature. In particular, when the firing temperature is equal to or higher than the temperature 40° C. lower than the glass transition temperature and lower than the temperature 15° C. lower than the glass transition temperature, for example, when the firing temperature is about 30° C. lower than the glass transition temperature, the time taken for firing the hard coat is about 0.5 to 2 hours.

The lenses produced as described above are worked into end products such as sunglasses, goggles, etc., by lens manufacturers and sold, or worked by individual dealers (retail stores) into various products by conducting lens edging, hole-forming, screw tightening, and the like, and sold as sunglasses and goggles.

EXAMPLES

Preparation of Specimen

A stretched aromatic polycarbonate sheet 0.3 mm in thickness was bonded with an adhesive to each of two surfaces of a stretched and dyed polyvinyl alcohol polarizing film while aligning the axes of stretching. An aromatic polycarbonate polarizing sheet 0.6 mm in thickness was obtained as a result. The polarizing sheet was cut into a shape suitable for two-eye lenses to prepare an individual laminated polarizing sheet.

The individual laminated polarizing sheet was heat-bent to obtain a heat-bent polarizing sheet.

Heat-bending was performed with a continuous heat bending apparatus, which involved preliminarily heating a sheet by a preheater, placing the preheated sheet on a partially spherical female mold having a particular curvature at a particular temperature, pressing a silicon rubber male mold onto the female mold while starting pressure-reduction so as to allow the sheet to stick to the female mold, withdrawing the male mold, retaining the punched-out piece sticking to the female mold in a hot air atmosphere at a particular temperature for a particular time, and then removing the punched piece.

In the process described above, the preliminary heating for the individual laminated polarizing sheet was conducted at a 138° C. atmosphere temperature. The female mold was an 8R-equivalent partial sphere (radius: about 65.6 mm) and the surface temperature was 138° C. The length of time the silicon rubber male mold was pressed was 2 seconds. The sheet was caused to stick to the female mold in an atmosphere in which hot air having a temperature of 140° C. was blown for 9 minutes.

Example 1

The protective film attached to both surfaces of the heat-bent polarizing sheet obtained above was separated, and hundred sheets were superimposed as shown in FIG. 1 by means of an HDPE film as an isolation film.

Next, hundred sheets obtained above were placed in a plastic tray and capped so as to obtain a primary package. The three primary packages were placed in a high gas-barrier bag for RP System produced by Mitsubishi Gas Chemical Company, Inc. and sealed by fusion bonding while injecting dehumidified air so as to obtain a secondary package.

After being stored at room temperature for 1 month, the secondary package was placed in a corrugated fiberboard box and traveled 500 km by car.

After being taken out from the secondary package, the heat-bent polarizing sheets were set to the mold cavity of an injection molding machine without performing preliminary drying and injection molding was conducted by using an aromatic polycarbonate resin (viscosity-average molecular weight: 23000, trade name: Iupilon CLS3400 produced by Mitsubishi Engineering-Plastics Corporation). Thereafter an injection-molded polarizing lens was obtained. The injection molding conditions were as follows: resin temperature: 310° C., injection pressure: 125 MPa, holding pressure: 63 MPa, mold temperature: 80° C., and injection cycle: 70 seconds.

As a result of evaluating scratches, fouling and foreign substances of the injection-molded polarizing lenses, none of them have occurred and no color change was found. The lenses had a good appearance to the extent which they could be used as a product.

Furthermore, it has become possible to take out a heat-bent polarizing sheet while winding up an isolation film, which allows the heat-bent polarizing sheet to be held and transferred by vacuum-suction from the concave surface side with an automatic machine and to be set onto the mold cavity of an injection molding machine.

Example 2

An injection-molded polarizing lens was obtained in the same process as in Example 1 except that a isolation film was changed to vinylidene chloride. The injection-molded polarizing lens was fouled and it was inappropriate as a product.

Example 3

An injection-molded polarizing lens was obtained in the same process as in Example 1 except that an isolation film was changed to a thick paper. The injection-molded polarizing lens had scratches, fouling and foreign substances and it was inappropriate as a product.

Example 4

An injection-molded polarizing lens was obtained in the same process as in Example 1 except that an isolation film was changed to a thin paper. The injection-molded polarizing lens had scratches, fouling and foreign substances and it was inappropriate as a product.

Example 5

Injection-molding was attempted in the same process as in Example 1 except that an isolation film was not used. As a result, several heat-bent polarizing sheets adhered to each other and could not be used in injection molding. Although the sheets thereof were released so as to obtain an injection-molded polarizing lens, it was scratched and inappropriate as a product.

Example 6

An injection-molded polarizing lens was obtained in the same process as in Example 1 except that an isolation film was changed to LDPE. The injection-molded polarizing lens did not have any scratches, fouling, foreign substances nor color change. The lens had a good appearance to the extent which it could be used as a product.

TABLE 1

| Example | Isolation film | Result of appearance evaluation of an injection-molded polarizing lens | | |
|---|---|---|---|---|
| | | scratches | fouling | foreign substances |
| 1 | HDPE | o | o | o |
| 2 | Vinylidene chloride | o | x | o |
| 3 | Thick paper | x | x | x |
| 4 | Thin paper | x | x | x |
| 5 | None | x | o | o |
| 6 | LDPE | o | o | o |

The invention claimed is:

1. A package of heat-bent polarizing sheets, each heat-bent polarizing sheet having a convex surface side and a concave surface side, in which polarizing sheets heat-bent for injection molding are cumulatively packaged by means of a non-adhesive isolation film so as to withstand moisture, and then stored or transported,
wherein the package is a three side seal bag made from a continuous peelable film with a width sufficient to put a heat-bent polarizing sheet,
wherein the convex surface side of each heat-bent polarizing sheet from which a protective film has been separated and removed, is superimposed on the non-adhesive isolation film and then the non-adhesive isolation film with a predetermined width is moved so as to form layers, and is superimposed on the concave surface side of the heat-bent polarizing sheet,
wherein the heat-bent polarizing sheets are heat-bent polarizing sheets that can be used in injection molding without performing preliminary drying as a pretreatment of injection molding and without protective-film removal work.

2. The package of the heat-bent polarizing sheets according to claim 1, wherein the packaged heat-bent polarizing sheet has a moisture content of 0.35 wt % or less and preferably 0.3 wt % or less.

3. The package of the heat-bent polarizing sheet according to claim 1, wherein an amount of water vapor in gas inside the package is 15 g/m$^3$ or less and preferably 14 g/m$^3$ or less.

4. The package of the heat-bent polarizing sheet according to claim 1, wherein transparent plastic sheets bonded to a polarizing film to form the heat-bent polarizing sheet have a thickness of 0.1 to 1 mm and are transparent plastic sheets containing at least one selected from the group consisting of an aromatic polycarbonate, polyacrylate, polyamide, acetylcellulose, and a composition containing an aromatic polycarbonate and an alicyclic polyester.

5. The package of the heat-bent polarizing sheet according to claim 1, wherein the package is a primary package in which several dozen to several hundred heat-bent polarizing sheets which separated from protective films used during heat bending are cumulatively packaged by means of a non-adhesive isolation film, and a durable secondary package in which a plurality of the primary packages are packaged.

6. The package of the heat-bent polarizing sheet according to claim 5, wherein the primary package or the durable secondary package has a sufficient buffer layer at least around the package and the buffer layer is formed of a non- or low-dust-generating material or covered with a non- or low-dust-generating material so that the buffer layer has a non- or low-dust-generating property.

7. The package of the heat-bent polarizing sheet according to claim 5, wherein the primary package is a package in which heat-bent polarizing sheets are accommodated in a loadable container and the container is formed of a non- or low-dust-generating material or covered with a non- or low-dust-generating material so that the container has a non- or low-dust-generating property.

8. The package of the heat-bent polarizing sheet according to claim 5, wherein a package material used in the secondary package is at least one selected from a single-wall corrugated fiberboard, a double-wall corrugated fiberboard, a triple-wall corrugated fiberboard, a plastic, a corrugated plastic, etc.

9. The package of the heat-bent polarizing sheet according to claim 5, wherein the dampproof package material is used in packaging of the primary package or the durable secondary package.

10. The package of the heat-bent polarizing sheet according to claim 5, wherein air inside packaging of the primary package and/or the durable secondary package is substituted with dry air or nitrogen, or the pressure thereof is reduced inside.

11. The package of the heat-bent polarizing sheet according to claim 1, wherein the non-adhesive isolation film is selected from polyolefin film.

12. The package of the heat-bent polarizing sheet according to claim 1, wherein a desiccant is enclosed and the desiccant is at least one selected from silica gel, quicklime, a calcium chloride processed product, silica alumina gel, clay, and a sheet-shaped desiccant.

13. The package of the heat-bent polarizing sheet according to claim 1, wherein a sensor that detects packaging conditions is enclosed and the sensor detects water vapor partial pressure or oxygen.

14. The package of the heat-bent polarizing sheet according to claim 1, wherein the package is sealable or easy-sealable after the package is unsealed.

15. The injection-molded polarizing lens, in which the heat-bent polarizing sheet stored in the package according to claim 1 is a heat-bent polarizing sheet that is subjected to injection molding without performing preliminary drying as a pretreatment of injection molding and without substantial protective-film removal work.

* * * * *